455/12

NO Plural signals a[...]

536,466

May 14, 1968 G. BATTAIL ETAL 3,383,597

MULTIPLE ACCESS SATELLITE COMMUNICATION SYSTEM

Filed Feb. 28, 1966

F 2-26-65 ✓

INVENTORS
GERARD BATTAIL & PIERRE BROSSARD
BY
Abraham A. Saffitz
ATTORNEY

B 1072019 both
F 1438315 (say 2-27-65)

United States Patent Office 3,383,597
Patented May 14, 1968

3,383,597

MULTIPLE ACCESS SATELLITE COMMUNICATION SYSTEM

Gerard Battail, 30 Blvd. du Temple, Paris, France, and Pierre Brossard, 9 Rue des Fleurs, Montigny-le-Bretonneux, France Filed Feb. 28, 1966, Ser. No. 530,460
Claims priority, application France, Feb. 26, 1965, 7,356
5 Claims. (Cl. 325—155)

The present invention is concerned with a satellite transmission system of the multiple access kind, that is to say, the kind permitting simultaneous communications, in particular a transmission system of the type in which the satellite equipment is merely an amplifier connected to a carrier frequency changer.

The problem for which the present invention provides a solution relates to the utilization of the satellite to transmit a number of independent communications. The system must, therefore, permit a kind of multiplexing.

Some multiple access systems utilize, as in the standard telephone multiplex transmission systems, a frequency-division between the different access channels of the available frequency band (that of the satellite amplifier) or a time division. The first solution (frequency allocation) necessitates the separation of the bands by filtering, which, in the case of frequency modulation, presents difficulties owing to the necessity of limiting phase distortion in the filters, which generates intermodulation between the channels when the modulating signal is a signal coming from a telephonic multiplex equipment of the "carrier wave" type.

The second solution (time distribution) supposes a general synchronization of the different stations which is extremely complex, particularly in the case of non-stationary satellites.

The multiple access transmission system which is the subject of the present invention, utilizes neither a division of the band of frequencies nor a time division between the access channels. The different signals are permanently present and occupy the whole of the frequency band of the satellite amplifier. A system of this kind, known as a common time and spectrum system, is only possible if:

(1) Each of the transmitted signals possesses a distinguishing characteristic such that the corresponding receiver can select it without ambiguity and demodulate it correctly when the signal is intended for that receiver; in the following description it will be said that this receiver is adapted to this particular signal.

(2) In a given receiver disturbances caused by the signals other than that to which the receiver is adapted are present only to a very small extent; it is desirable, if the system is to be of any interest, that such disturbances should be of the same order as that of the "noise."

A system of this kind can have certain advantages with respect to the standard systems. In addition to avoiding the specific disadvantages of these systems, it often permits a more flexible exploitation in that each of the transmitted signals necessarily comprises the "address" of the destination; in dispersing the power of each communication throughout a large band of frequencies, it reduces the risk of active and passive interference, that is to say, interference affecting other systems (terrestrial radio waves for example) just as much as the interference which it receives.

Before describing the principles of the said system, which utilizes frequency modulation, it is necessary to define what will be called in the following a "reception threshold reducing frequency demodulator" for frequency modulated waves, in contrast to "the standard frequency demodulator." A standard frequency demodulator, for example of the kind having a limiter and frequency discriminator, receiving any signal (within certain limits, particularly of frequency and amplitude), generates an electric signal proportional to the instantaneous frequency of the said signal. A reception threshold reducing demodulator effects a certain choice among the incident signals, so as to discriminate from the noise and the possible interfering signals those which have properties distinctive of a signal high-index frequency modulated by the useful signal, namely constant amplitude and a comparatively slow rate of variation of instantaneous frequency (high-index frequency modulation here means the ratio of the maximum frequency excursion to the upper limit of the frequency band of the modulating signal is substantially larger than unity). The discrimination thus effected manifests itself by reducing the "reception threshold." A reception threshold reducing demodulator in the above sense, was the subject matter of U.S. Patent 3,217,262 in the names of the present applicants. There can also be included within this category demodulators of the "frequency excursion feedback" kind such as that described in the article by L. H. Enloe entitled "Decreasing the Threshold in F.M. by Feedback," in the American journal "Proceedings of the I.R.E.," January 1962, volume 50, No. 1, pp. 18–30.

It follows from this definition, that a reception threshold reducing demodulator has a very low sensitivity to a frequency modulated signal of which the instantaneous frequency varies at a speed much higher than that of the signal for which it is adapted. The basic idea, which is the feature of the invention, is to make a signal practically ineffective on a reception threshold reducing demodulator for which it is not intended, by the simple addition to the modulating signal of a signal of known form and of which the slope, that is to say the absolute value of the derivative of the voltage with respect to time, is large enough to ensure, within the range of frequencies covered by the said demodulator, a sufficiently large rate of variation of the instantaneous frequency. As the rate of variation of the instantaneous frequency is proportional to the product of the frequency excursion and the modulating signal frequency, the modulating signal must have a large amplitude (from which follows a large frequency excursion of the modulated signal) and a high frequency.

The addition to the modulating signal of an additional signal of known waveform permits, moreover, by the choice of a parameter of this additional signal, to define the destination of the composite signal; the said additional signal then constitutes an "address signal." The signal to be transmitted will be called "a communication signal" in order to distinguish it from the address signal.

For reasons which will be given in the following description, the value of the frequency excursion relative to the address signal must be large relative to the maximum value of the excursion relative to the communication signal.

In other words, the basic idea of the invention is as follows: each receiving station of the radiocommunication network includes a reception threshold reducing demodulator adapted (or matched) to a given communication signal, to which corresponds a certain maximum rate of variation of instantaneous frequency; therefore, the said demodulator is almost insensitive to a frequency modulated signal having a rate of variation of instantaneous frequency much higher than the said maximum rate. Each of the reception threshold reducing demodulators is inserted in a negative feedback loop, acting on the frequency excursion of one particular address signal, uniquely characterising the receiving station to which the demodulator considered belongs. While the rate of variation of instantaneous frequency of the frequency modulated signals that the said demodulator receives is large enough to make it practically insensitive to them, an exception results from the loop operation, which practically cancels the rate of variation of instantaneous frequency corresponding to the particular address signal for which the said feedback loop works; the reception threshold reducing demodulator then receives a signal which is frequency modulated by the sole communication signal, to which it is adapted.

A multiple access radiocommunication system in accordance with the invention will now be described, on the assumption that the address signals are sinusoidal and that their parameter which is characteristic of the addressee is the frequency.

The different stations of the radiocommunication system of the invention comprise each a transmitter and a receiver. A single carrier frequency is common to all the transmitters intended to operate in the same network. In the same way, all the receivers of this network are tuned to the frequency which results from the transposition, effected within the satellite, of the carrier frequency common to the transmitters. Under these conditions, each of the transmitters can communicate with any one of the receivers. As the receivers are characterised by address frequencies $F_1$, $F_2$ . . . $F_N$ (N being the number of stations), for a given communiction signal to be received exclusively by the corresponding receiver at the address frequency $F_1$ (for example) it is only necessary for a sinusoidal signal of frequency $F_1$ to be added to the said communication signal before frequency modulation, the frequency excursions, relative respectively to the communication signal and the address signal of frequency $F_1$, being smaller for the first than for the second and being fixed, as will be explained later.

The receiver of the system of the invention, adapted to a signal of address frequency $F_1$, is constituted by a reception threshold reducing demodulator inserted in a loop of the kind known as a "frequency excursion feedback" loop. In other words, the result of the demodulation of the reception threshold reducing demodulator is used, after filtering and amplification, to frequency modulate a local oscillator having a frequency different from the carrier frequency of the incident wave, and the frequency modulated signal from the said local oscillator is applied to one of the inputs of a mixer (this term being understood in the sense of "frequency changer") which receives at its other input the incident signal and of which the output is connected to the input of the reception threshold reducing demodulator mentioned above. The sense of the modulation of the wave generated by the local oscillator is selected in such a manner that a variation of the demodulated signal causes a variation of the instantaneous frequency which, demodulated, is in a sense opposite to the initial variation. However, unlike the demodulation devices such as that which is described in the article by L. H. Enloe already referred to, that of the receiver of the system of the invention comprises a feedback selective to the frequency $F_1$. In this manner, it is the address signal alone which, after amplification, modulates the wave provided by the local oscillator which controls the change of frequency of the incident wave. The amplification which precedes demodulation of the wave provided by the local oscillator is effected, in a receiver of the system of the invention, with a gain sufficiently high for the variations of the instantaneous frequency at the frequency $F_1$ to be practically cancelled. On the contrary, by reason of the selectivity of the frequency excursion feedback thus effected, the communication signal without modification modulates the wave which is present at the output of the mixer. The reception threshold reducing demodulator, connected to the output of the said mixer, thus receives substantially (subject to a change of carrier frequency) the signal which it would have received in the case of a standard frequency modulated transmission. In the receiver intended for the signal of which the address frequency is $F_1$, the feedback device which has just been described, has in effect canceled, ahead of the reception threshold reducing demodulator, the frequency excursion relative to the address signal of frequency $F_1$; more precisely, the signal has been coupled to the receiver by this very cancellation. Of course, the operation of the system requires that all the other signals, with which are associated address frequencies different from $F_1$, transmitted by the other stations of the system and retransmitted in the same way by the satellite, produce at the input of the reception threshold reducing demodulator within the receiver adapted for the signal of address frequency $F_1$, variations of the instantaneous frequency which are sufficiently rapid that they influence only to a negligible extent the demodulation effected by the said reception threshold reducing demodulator of the communication signal associated with $F_1$. It will be shown that this is possible, on condition that the address frequencies on the one hand and the frequency excursions associated with the address signals on the other hand, are selected according to rules which will be set out in detail later.

Let $F_2$ be an address frequency different from $F_1$. The composite signal formed by the communication signal added to the address signal of frequency $F_2$ is subjected in the receiver adapted to the address signal of frequency $F_1$ to a change of frequency due to the signal coming from the local oscillator of the said receiver. However, this oscillator signal is modulated at a frequency $F_1$ with a frequency excursion substantially equal to the frequency excursion associated in the corresponding transmitter with the address signal of frequency $F_1$, (since the gain of the feedback loop of the receiver adapted to the corresponding signal $F_1$ has been supposed to be large). The said change of frequency therefore provides a signal modulated by the sum of two sinewaves, one of frequency $F_1$ and the other of frequency $F_2$, the two sinewaves having amplitudes proportional to the frequency excursions of the two address signals. The type of signal which results from this is well known as a "beat signal." Its amplitude remains greater than a certain minimum, proportional to the absolute value of the difference of the frequency excursions of the two address signals and its frequency is at least equal to the lower of the frequencies $F_1$ and $F_2$.

As has been stated, it is thus possible to select the frequencies $F_1$ and $F_2$ on the one hand and the absolute value of the difference between the frequency excursions which correspond to them on the other hand, so that these are large enough to keep the rate of variation of the instantaneous frequency larger than the minimum value necessary to limit disturbance due to the address signal associated with $F_2$, within the useful range of instantaneous frequencies of the reception threshold reducing demodulator included in the receiver adapted to the frequency $F_1$.

The invention will be better understood from a consideration of the detailed description which will now be given, with reference to the accompanying drawings in which:

FIGURE 2 shows the waveform of the signal which frequency modulates the wave applied to the input of the reception threshold reducing demodulator included in a receiver of the system according to the invention, produced by an address signal the address frequency of which is different from that to which the receiver is adapted.

Figure 1:
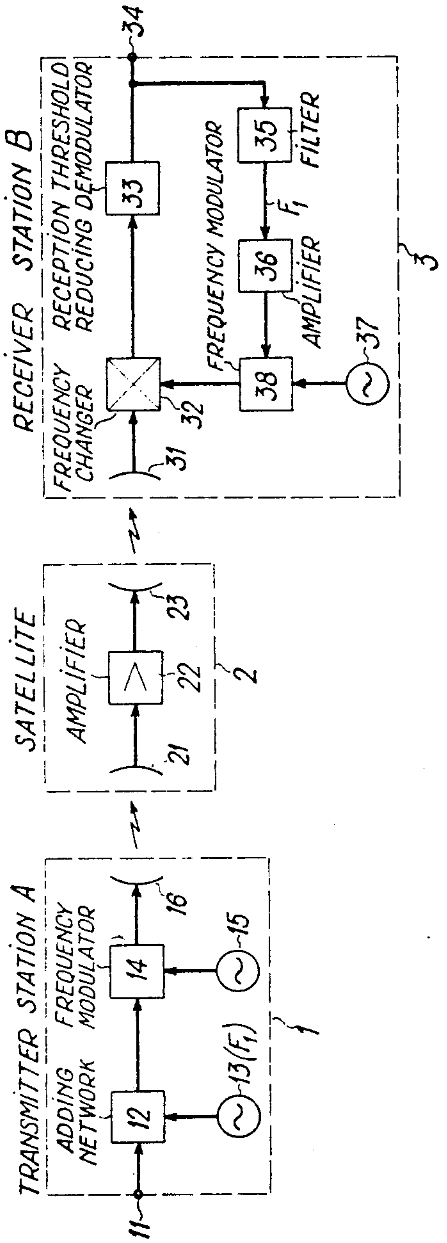
FIGURE 1 shows the connection between a transmitter and a receiver, by way of a satellite, in accordance with the principle of the invention.
Figure 1:
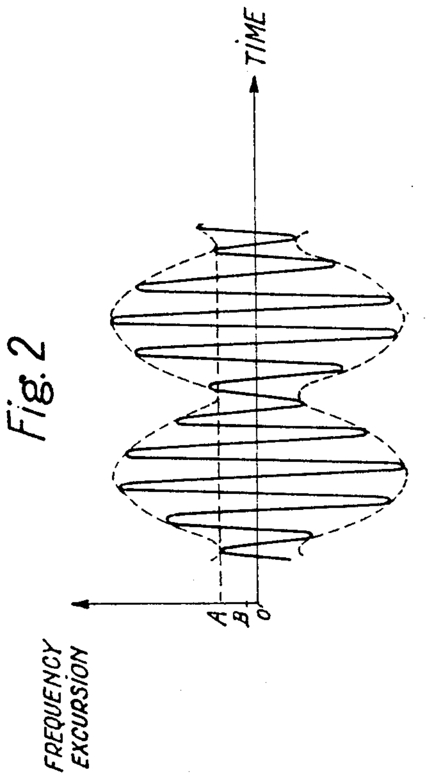

FIGURE 1 shows one connection from among those which can be simultaneously established through the satellite 2. The said connection exists between the transmitter of a station A, represented in its entirety by the reference numeral 1, and the receiver of another station B, indicated in its entirety by the reference numeral 3. As the carrier frequencies play no part in the system of the invention, the carrier frequency transpositions to which the signals are subjected in the stations and in the satellite have not been shown.

Under these conditions, the modulating signal to be transmitted applied at the input 11 of the transmitter 1, is added in a summing network 12 of conventional design to the sinusoidal signal of frequency $F_1$ from the address-oscillator 13. The sum of these two signals, provided by the summing network 12, frequency modulates the carrier wave produced by the oscillator 15, in the modulator 14. The signal obtained is transmitted to the satellite by means of the antenna 16.

The signal thus transmitted is received by the antenna 21 of the satellite 2, amplified in the amplifier 22 and subjected to a change of carrier frequency, and transmitted to the receiving station by the antenna 23.

The signal thus transmitted is received by the antenna 31 of the receiver 3 and is applied to one of the inputs of the mixer 32. The output of the said mixer 32 is connected to the reception threshold reducing demodulator 33, the output of which is connected on the one hand to the output terminal 34 of the receiver 3 and on the other hand to the input of the filter network 35. The filter network 35 is of the bandpass type and its pass band is centred on the frequency $F_1$. It has a very small bandwidth, that is to say that only signals very close to $F_1$ are transmitted without substantial attenuation. By a very small bandwidth, it is intended to cover the variations to which the frequency $F_1$ is subjected as a consequence of drift or instability of the oscillator 13 which generates the signal and as consequence of the Doppler effect due to movement of the satellite 2.

The output of the filter network 35 is connected to the input of the amplifier 36. The signal from this amplifier 36 frequency modulates, in the modulator 38, the wave produced by the local oscillator 37 and the output of the modulator 38 is connected to the second input of the mixer 32. The frequency of the local oscillator 37 is assumed to be different from the carrier frequency common to the various signals received at the first input of the mixer 32, so that the central frequency of the signal coming from the mixer 32 is (for example) the difference of the carrier frequency of the received signals at the first input of the mixer 32 and the frequency of the local oscillator 37. The central frequency of the reception threshold reducing demodulator 33 is equal to the said difference and the parameters of the said demodulator are chosen in such a manner that it demodulates in the best conditions the communication signal associated with the address frequency $F_1$. The frequency excursion of the signal coming from the mixer 32 is equal to the difference between the excursion of frequency of the signal received at the first input of the said mixer and that of the signal from the modulator 38.

In these circumstances, the oscillator 13 of the transmitter 1 generates a signal having a frequency $F_1$, which is added in the summing network 12 to the communication signal applied to the input 11 of the transmitter 1, before the frequency modulation in the modulator 14 of the carrier current produced by the oscillator 15 and transmission of the modulated signal by radiation from the antenna 16. In accordance with the principle of the system, as already explained, the transmitted wave thus comprises an address signal characteristic of its addressee.

As the satellite 2 behaves as a simple amplifier, as explained above, the antenna 31 of the transmitter 3 receives a signal which is substantially of the same form as that transmitted by the antenna 16 of the transmitter 1 (neglecting the frequency transposition which, as already stated, plays no part in the system of the invention).

In the receiver 3, the feedback loop formed by the filter network 35, the amplifier 36 and the modulator 38, driving the mixer 32, plays practically no part as far as the communication signal associated with the address frequency $F_1$ is concerned, by reason of the selectivity, mentioned above, of the filter network 35. On the other hand, the address signal of frequency $F_1$, transmitted without substantial attenuation by the filter network 35 and strongly amplified by the amplifier 36, is subjected to strong feedback in frequency excursion through the modulator 38 and the mixer 32. It can thus be considered that the frequency excursion of the signal applied to the input of the reception threshold reducing demodulator 33 comprises only a negligible component of the address frequency $F_1$, while the communication signal is present in it without modification. It is thus demodulated in the normal way by the demodulator 33 and appears at the output terminals 34 of the receiver 3.

The behaviour of the receiver 3 in response to signals of address frequency different from the frequency $F_1$ which characterizes the said receiver, will now be examined. Let it be assumed that $F_2$ is the address frequency of another station of the system. This signal is received by the antenna 31 of the receiver 3 and applied at one of the inputs of the mixer 32, which receives at its other input the signal from the local oscillator 37 which, as stated above, is frequency modulated by a waveform of frequency $F_1$ when the signal of address frequency $F_1$ is received. Thus, as a consequence of the operation of the mixer 32, the signal at its output corresponding to the address frequency $F_2$ is modulated by the difference between the signal which modulates the waveform produced by the oscillator 37 and the signal of address frequency $F_2$. As a consequence, since the signal which modulates the waveform produced by the local oscillator 37 is, to a good approximation, equal to the opposite of the signal of address frequency $F_1$, the signal which appears at the output terminals of the mixer 32 is in practice modulated by the sum of the signal of address frequency $F_1$ and the signal whose address frequency is $F_2$ (this latter signal being itself the sum of the signal of address frequency $F_2$ and a certain communication signal). In addition to this communication signal, the signal modulating the waveform from the mixer 32 and applied to the input of the reception threshold reducing demodulator 33, thus has, as far as the signal of address frequency $F_2$ is concerned, the form shown in FIGURE 2. This figure shows the variation, as a function of time, of the instantaneous frequency of the waveform applied to the input of the reception threshold reducing demodulator 33.

It is necessary to select (i) the absolute values of the frequency excursions of the address signals of frequencies $F_1$ and $F_2$ on the one hand, (ii) the lower of the frequencies $F_1$ and $F_2$ (or, if the greatest frequency excursion corresponds to the larger of the two frequencies $F_1$ and $F_2$, their half-sum $(F_1+F_2)/2$) on the other hand, large enough to ensure that the absolute value of the slope of the curve of FIGURE 2 remains greater than a predetermined minimum, in the sum of the instantaneous frequencies of the reception threshold reducing demodulator 33; the said predetermined minimum being chosen in such a manner that disturbance reaching the receiver 3, which is adapted to the address frequency $F_1$, remains within acceptable and specified limits.

It is clear from FIGURE 2 that the difference OA of any two of the frequency excursions must be distinctly greater than the maximum frequency excursion OB associated with the communication signals. Moreover, safety margins must be provided for in relation to the values thus determined, to take into account the addition of the communication signal associated with $F_2$, to the modulating signal shown in FIGURE 2.

Naturally, the frequencies $F_1$ and $F_2$ which have been considered are any two of the address frequencies of the system. The above mentioned conditions must therefore be satisfied by any pair of the address signals. In addition, as the mixer 32 of the receiver 3 of FIGURE 1 is a linear device, as far as the instantaneous frequency is concerned, the waveforms coming from the said mixer 32, due to the various signals received (corresponding to the address frequencies $F_2 \ldots F_N$) are separately transposed in frequency by the mixer 32 of FIGURE 1. Thus there is applied to the input of the reception threshold reducing demodulator 33 of FIGURE 1, a source of waves each of which is modulated by a waveform analogous to that shown in FIGURE 2. The analysis made above for two frequencies only thus has general validity.

Apart from the conditions mentioned above concerning the choice of address frequencies of the system and the frequency excursions which are associated with them, the good operation of the system requires a certain number of conditions which will now be enumerated:

(a) All the address frequencies must be located above the basic band of the communication signals, in order to prevent an address frequency or its harmonics from interfering with the useful signal.

(b) Each of the address frequencies must not be a harmonic of another, in order to avoid the risk that one of the receivers might lock (through its frequency excursion feed-back loop) on a harmonic of an address frequency lower than that to which the receiver is adapted.

(c) The difference between two neighbouring address frequencies must be larger than the basic band of communication signals, in order to prevent the detection of the envelope of their sum, which might be produced owing to the non-linearity of certain parts, from producing a frequency signal belonging to the useful band of communication signals.

(d) The absolute value of the difference of the frequency excursions associated with any two of the address signals must be distinctly larger than the maximum frequency excursion of the communication signals. This condition permits on the one hand the setting of a lower limit to the speed of variation of the inntantaneous frequency of the waveform applied to the input of the reception threshold reducing demodulator 33 in FIGURE 1, and on the other hand it permits to be taken into consideration the addition to the interfering address signal of the communication signal which is associated with it.

This last condition can be less rigorously applied for the highest address frequencies since, even in the case in which cancellation of the speed of variation of the instantaneous frequency is produced in the useful band of the reception threshold reducing demodulator 33 of FIGURE 1, the time during which the said speed of variation remains small is sufficiently brief to produce only a negligible disturbance of the operation of the said demodulator 33.

By way of non-limiting example, the table below gives the possible values of the address frequencies and frequency deviations which are associated with them, satisfying the conditions which have been set out, on the assumption of ten stations each transmitting a communication signal ronstituted by a group of twenty four telephonic channels multiplexed by frequency distribution (channels known as "carrier current"), the basic band of which extends from 12 to 108 kc./s. It has been assumed that the frequency band of the satellite amplifier was about 50 mc./s. and that the maximum frequency deviation associated with the communication signals remained below 1.1 mc./s.

| | Address Frequency (kc./s.) | Frequency Deviation of Address Signal (mc./s.) |
|---|---|---|
| Station Number: | | |
| 1 | Nil | 0 |
| 2 | 130 | 2.85 |
| 3 | 250 | 5.48 |
| 4 | 370 | 8.11 |
| 5 | 490 | 10.7 |
| 6 | 610 | 13.4 |
| 7 | 730 | 16.0 |
| 8 | 850 | 18.6 |
| 9 | 970 | 21.2 |
| 10 | 1,090 | 23.9 |

The system of the invention which has been described involves sinusoidal address signals. Employing such sinusoidal address signals is by no means necessary, however; on the contrary, it results in a comparatively poor efficiency in using the frequency spectrum. This efficiency can be improved when non-sinusoidal signals, and especially "triangular waves" whose absolute value of slope is constant, are used, with the obvious drawback of making less simple implementing with required accuracy both the address-oscillators of the transmitting stations, and the feedback loop of the receiving stations of the system.

What we claim is:

1. Multiple access, common time and common spectrum, communication system formed by a plurality of land transmitters and receivers and a single satellite repeater comprising in each transmitter a source of communication signals and a source of address signals selectively associated with the receivers of the system, a first carrier wave generator, means for adding said communication signals and said address signals thereby forming composite signals, means for frequency-modulating said first carrier wave by said composite signals and means for transmitting the resultant first frequency-modulated signals, in the satellite means for changing the carrier frequency of said frequency-modulated signals, in each receiver means for receiving said first frequency-modulated signals, frequency changer means connected to said receiving means, a frequency demodulator connected to said frequency changer means and adapted to only demodulate frequency modulated signals whose variation with respect to time of the instantaneous frequency is equal to or smaller than a given value, means connected to the output of said demodulator for discriminating the address signal associated with the said receiver, a second carrier wave generator, means for frequency-modulating said second carrier wave by the address signal issuing from said discriminating means and means for applying the resultant second frequency-modulated signal to said frequency changer means, whereby the frequency excursion due to the address signal associated with the said receiver is substantially cancelled.

2. Multiple access, common time and common spectrum, communication system according to claim 1 in which the address signals have different frequencies respectively associated with the receivers of the system and the means for discriminating the address signal associated with a given receiver is a filter tuned to the address signal frequency associated with this receiver.

3. A multiple access, common time and common spectrum, communication system according to claim 1 in which the address signals are sine signals having frequencies outside the frequency band of the communication signals and higher than the upper limit of said band, and having amplitudes substantially higher than the amplitude of the communication signals in order for the frequency excursions relative to the address signals to be substantially larger than the frequency excursion relative to the communication signals.

4. A multiple access, common time and common spectrum, communication system according to claim 1 in which the difference between any two successive values of the address frequencies selectively associated with the receivers of the system is higher than the upper limit of the frequency band of the communication signals.

5. A multiple access, common time and common spectrum, communication system according to claim 1 in which the frequency excursions relative to the address signals in the first frequency-modulated signals are different for each address signal and wherein the difference between any two address signal frequency excursions is substantially larger than the communication signal frequency excursion.

References Cited

UNITED STATES PATENTS

| | | | |
|---|---|---|---|
| 2,407,212 | 9/1946 | Tunick | 325—7 |
| 2,527,561 | 10/1950 | Mayle | 325—392 |
| 3,217,262 | 11/1965 | Battail | 329—110 |

ROBERT L. GRIFFIN, *Primary Examiner.*

A. J. MAYER, *Assistant Examiner.*